United States Patent
Hsieh et al.

(10) Patent No.: US 8,553,753 B2
(45) Date of Patent: Oct. 8, 2013

(54) CLOCK-SYNCHRONIZED METHOD FOR UNIVERSAL SERIAL BUS (USB)

(75) Inventors: Jiun-cheng Hsieh, Taipei (TW); Ying-chen Lin, Xindian (TW)

(73) Assignee: Genesys Logic, Inc., Taipei (TW)

( * ) Notice: Subject to any disclaimer, the term of this patent is extended or adjusted under 35 U.S.C. 154(b) by 423 days.

(21) Appl. No.: 12/853,636

(22) Filed: Aug. 10, 2010

(65) Prior Publication Data
US 2012/0020404 A1    Jan. 26, 2012

(30) Foreign Application Priority Data
Jul. 22, 2010 (TW) .............................. 99124137 A

(51) Int. Cl.
  *H03H 7/30*  (2006.01)
  *H03H 7/40*  (2006.01)
  *H03K 5/159* (2006.01)

(52) U.S. Cl.
  USPC .......................................... 375/231; 375/354

(58) Field of Classification Search
  USPC .................................. 375/231, 354
  See application file for complete search history.

(56) References Cited

U.S. PATENT DOCUMENTS

| | | | |
|---|---|---|---|
| 8,345,778 B2 | 1/2013 | Kennedy et al. | |
| 2009/0213845 A1* | 8/2009 | Li | 370/352 |
| 2010/0191525 A1* | 7/2010 | Rabenko et al. | 704/211 |

FOREIGN PATENT DOCUMENTS

CN    101422005    4/2009

* cited by examiner

Primary Examiner — Shuwang Liu
Assistant Examiner — Nader Bolourchi

(57) ABSTRACT

A clock-synchronized method for universal serial bus (USB) is described. The method includes the following steps of: (a) a transmitter sends a periodic signal to a host unit during a first time interval; (b) the host unit transmits a first equalization training sequence signal to a receiver during a second time interval to train the receiver and the transmitter continuously sends the periodic signal to the host unit; (c) a clock and data recovery device extracts the first equalization training sequence signal during the second time interval to generate a extracted clock signal and a data signal; and (d) the transmitter sends a second equalization training sequence signal to the host unit based on the extracted clock signal during the third time interval to train the host unit and the receiver and the transmitter commonly utilize the extracted clock signal as a reference clock.

9 Claims, 4 Drawing Sheets

CLOCK-SYNCHRONIZED METHOD FOR UNIVERSAL SERIAL BUS (USB)

CLAIM OF PRIORITY

This application claims priority to Taiwanese Patent Application No. 099124137 filed on Jul. 22, 2010.

FIELD OF THE INVENTION

The present invention relates to a clock-synchronized method, and more particularly to a clock-synchronized method which is compatible to the universal serial bus (USB) protocol.

BACKGROUND OF THE INVENTION

With the rapid development and progress of information technology, the consumer electronic products, such as portable storage and video/audio media, are widely used in the fields of data read/write and video image. Generally, the universal serial bus (USB) protocol is utilized as a communication bus which is served as the communication interface between the electronic product and the host unit. The USB protocol is developed from version 1.0 to version 3.0 in order to speed up the read/write process of the data stream of the electronic product. The USB 3.0 gradually becomes a standard interface for high-speed data transmission of the electronic product for increasing the access efficiency of the data.

The receiver and transmitter of the electronic product receive the information from the host unit (e.g. computer system) or transmits message to the host unit based on USB 3.0. An independent crystal oscillator or oscillation circuit has to be installed in the receiver and transmitter for providing a reference clock signal of the data transmission and reception between the receiver/transmitter and the host unit. However, the reference clock signal does not synchronized to the transmission frequency of the host unit. Therefore, an elastic buffer is disadvantageously disposed in the electronic product so that the electronic product may extract the signal from the host unit wherein the elastic buffer is used to buffer the frequency difference between reference clock signal and the transmission frequency of the host unit. Consequently, there is a need to develop a novel clock-synchronized method to solve the aforementioned problems.

SUMMARY OF THE INVENTION

The present invention provides a clock-synchronized method which is compatible to the universal serial bus (USB) protocol for synchronizing the host unit's clock signal with the controlled device's clock signal in clock-synchronized system.

The clock-synchronized system includes a host unit and a controlled device. The controlled device has a receiver, a transmitter, a clock and data recovery device, and a sequence encoder and decoder. The clock-synchronized method includes the following steps.

(a) The transmitter transmits a periodic signal to the host unit during a first time interval (T1). In one embodiment, the periodic signal is a low frequency periodic signal (LFPS) wherein the LFPS functions as the handshaking communication signal between the transmitter and the host unit.

(b) The host unit transmits a first training signal of equalization (TSEQ) to the receiver based on an operation clock during a second time interval wherein the transmitter continuously sends the periodic signal to the host unit during the second time interval (T2).

(c) The clock/data recovery device extracts the first training signal of equalization (TSEQ) for generating an extracted clock signal and a data signal during the second time interval (T2).

(d) The sequence encoder/decoder converts a data format of the data signal based on the extracted clock signal.

(e) The transmitter transmits a second training signal of equalization (TSEQ) to the host unit based on the extracted clock signal for training the host unit during a third time interval (T3) wherein the receiver and the transmitter commonly refer to the extracted clock signal. In one embodiment, the first training signal of equalization (TSEQ) and the second training signal of equalization (TSEQ) are compatible to the universal serial bus (USB) protocol. In one preferred embodiment, the frequency of the operation clock is synchronized to the extracted clock signal. That is, in the clock-synchronized system, the clock signal host unit is the same as the clock signals of the receiver and the transmitter of the controlled device to replace the conventional clock circuit and elastic buffer for saving the cost.

(f) The transmitter transmits the first training sequence 1 (TS1) to the host unit based on the extracted signal.

(g) The transmitter transmits the second training sequence 2 (TS2) to the host unit based on the extracted signal.

Person skilled should be noted that the training signal of equalization (TSEQ) sequence is a type of training signal of equalization (TSEQ), and thus different signal format may be used for the training signal of equalization (TSEQ).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
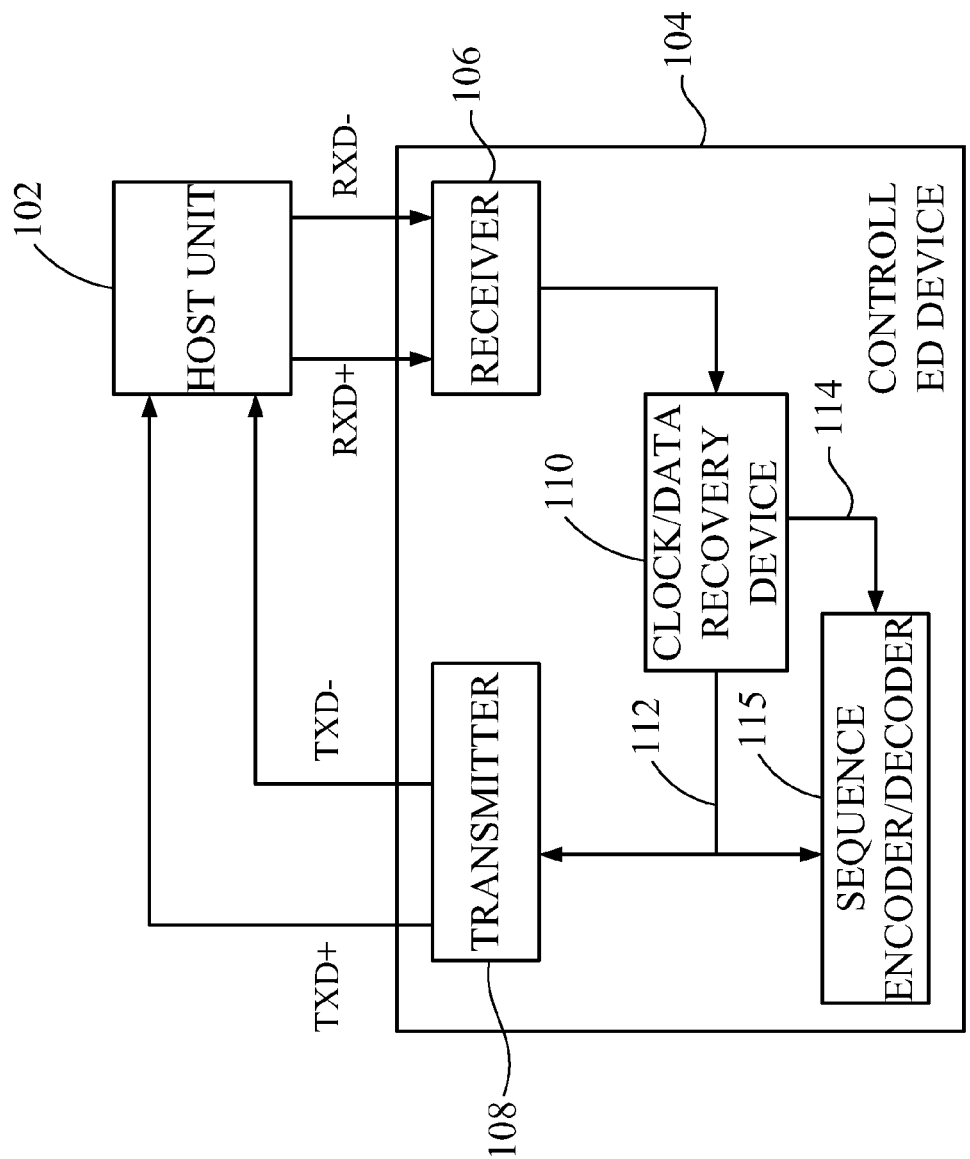
FIG. 1 is a schematic block diagram of a clock-synchronized system which is compatible to the universal serial bus (USB) protocol according to one embodiment of the present invention.

FIG. 1 is a schematic block diagram of a clock-synchronized system 100 which is compatible to the universal serial bus (USB) protocol according to one embodiment of the present invention. The clock-synchronized system 100 includes a host unit 102 and a controlled device 104. The controlled device 104 has a receiver 106, a transmitter 108, a clock and data recovery device 110, and a sequence encoder and decoder 115. The host unit 102 is coupled to the controlled device 104 and the receiver 106 is coupled to the host unit 102. The clock and data recovery device 110 couples the receiver 106 to the transmitter 108 and the sequence encoder and decoder 115, respectively. The transmitter 108 is coupled to the host unit 102.

The receiver 106 receives the differential signals "RXD+" and "RXD−" based on USB 3.0 SuperSpeed standard protocol. The clock/data recovery device 110 extracts the first training signal of equalization (TSEQ) for generating an extracted clock signal 112 and a data signal 114. The sequence encoder/decoder 115 converts a data format of the data signal 114 based on the extracted clock signal 112. The transmitter 108 transmits the differential signal "TXD+" and "TXD−" to the host unit 102 by the extracted clock signal according to on USB 3.0 SuperSpeed standard protocol. The operation clock frequency of the USB 3.0 SuperSpeed standard protocol is 5 gigabits per second (Gbps).

Figure 2:
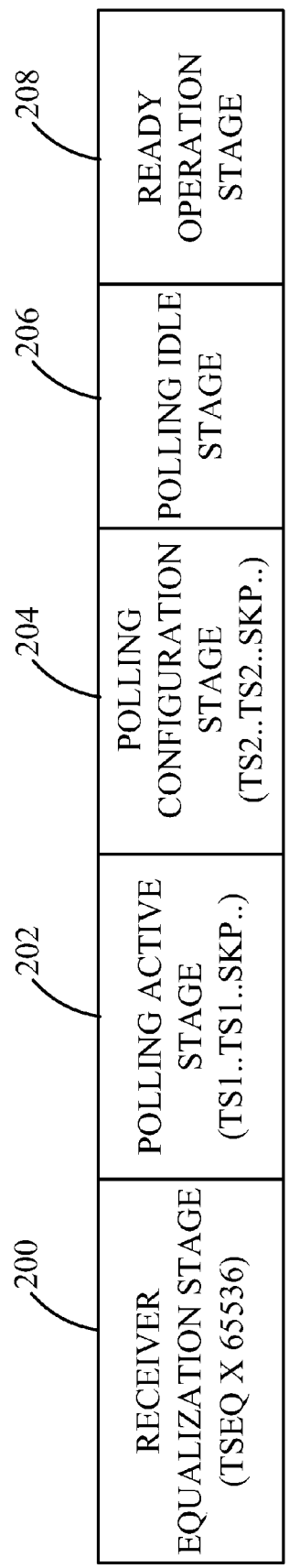
FIG. 2 is schematic view of status stages when the controlled device performs the polling step according to one embodiment of the present invention.

FIG. 2 is schematic view of status stages when the controlled device 104 performs the polling step according to one embodiment of the present invention. The status stages of the polling step further includes five stages to represent the link training status state machine (LTSSM). The five stages are a receiver equalization stage 200, a polling active stage 202, a polling configuration stage 204, polling idle stage 206, and a ready operation stage 208.

Specifically, the polling step is a state for link training between the host unit 102 and the controlled device 104. Before the SuperSpeed training is started, the transmitter 108 sends a periodic signal to the host unit 102 during the first time interval "T1" wherein the periodic signal functions as the handshaking communication signal between the transmitter 108 and the host unit 102. Bit lock, symbol lock and equalization training are achieved by using training signal of equalization (TSEQ), first training sequence 1 (TS1), and second training sequence 2 (TS2).

In the receiver equalization stage 200, for example, training signal of equalization (TSEQ) repeats 65536 times to allow for testing a plurality of coefficient settings. The training signal of equalization (TSEQ) is composed of a plurality of ordered sets which are used for initializing bit alignment, symbol alignment and optimization equalization. The ordered sets of the training signal of equalization (TSEQ) are described in Table 1. First column in the left represents "symbol number", second column in the middle represents "name", and third column in the right represents "value". For example, name "K28.5" in symbol number 1 is the control type code of the encoding mechanism, which has value "COM (comma)" used in symbol alignment. The name "D31.7" in symbol number 2 is the control type code of the encoding mechanism, which has value "0xFF". The rest may be inferred by analogy. The name "D10.2" in symbols 16 to 31 has the value "0x4A".

TABLE 1

| symbol number | name | value |
|---|---|---|
| 0 | K28.5 | COM (comma) |
| 1 | D31.7 | 0xFF |
| 2 | D23.0 | 0x17 |
| 3 | D0.6 | 0xC0 |
| 4 | D20.0 | 0x14 |
| 5 | D18.5 | 0xB2 |
| 6 | D7.7 | 0xE7 |
| 7 | D2.0 | 0x02 |
| 8 | D2.4 | 0x82 |
| 9 | D18.3 | 0x72 |
| 10 | D14.3 | 0x6E |
| 11 | D8.1 | 0x28 |
| 12 | D6.5 | 0xA6 |
| 13 | D30.5 | 0xBE |

TABLE 1-continued

| symbol number | name | value |
|---|---|---|
| 14 | D13.3 | 0x6D |
| 15 | D31.5 | 0xBF |
| 16-31 | D10.2 | 0x4A |

In the polling active stage 202, the controlled device 104 continuously links to the host unit 102 in SuperSpeed training procedure. The skip symbol "SKP" is used to compensate the different bit rates between ports wherein the skip symbol "SKP" can be dynamically either inserted to or removed from the data stream, as shown in FIG. 2. In the polling configuration stage 204, the two link patterns complete the Spuer-Speed training. In the polling idle stage 206, the ordered sets of second training sequence 2 (TS2) from polling configuration stage 204 are decoded and proceed to next stage, i.e. the ready operation stage 208.

Figure 3:
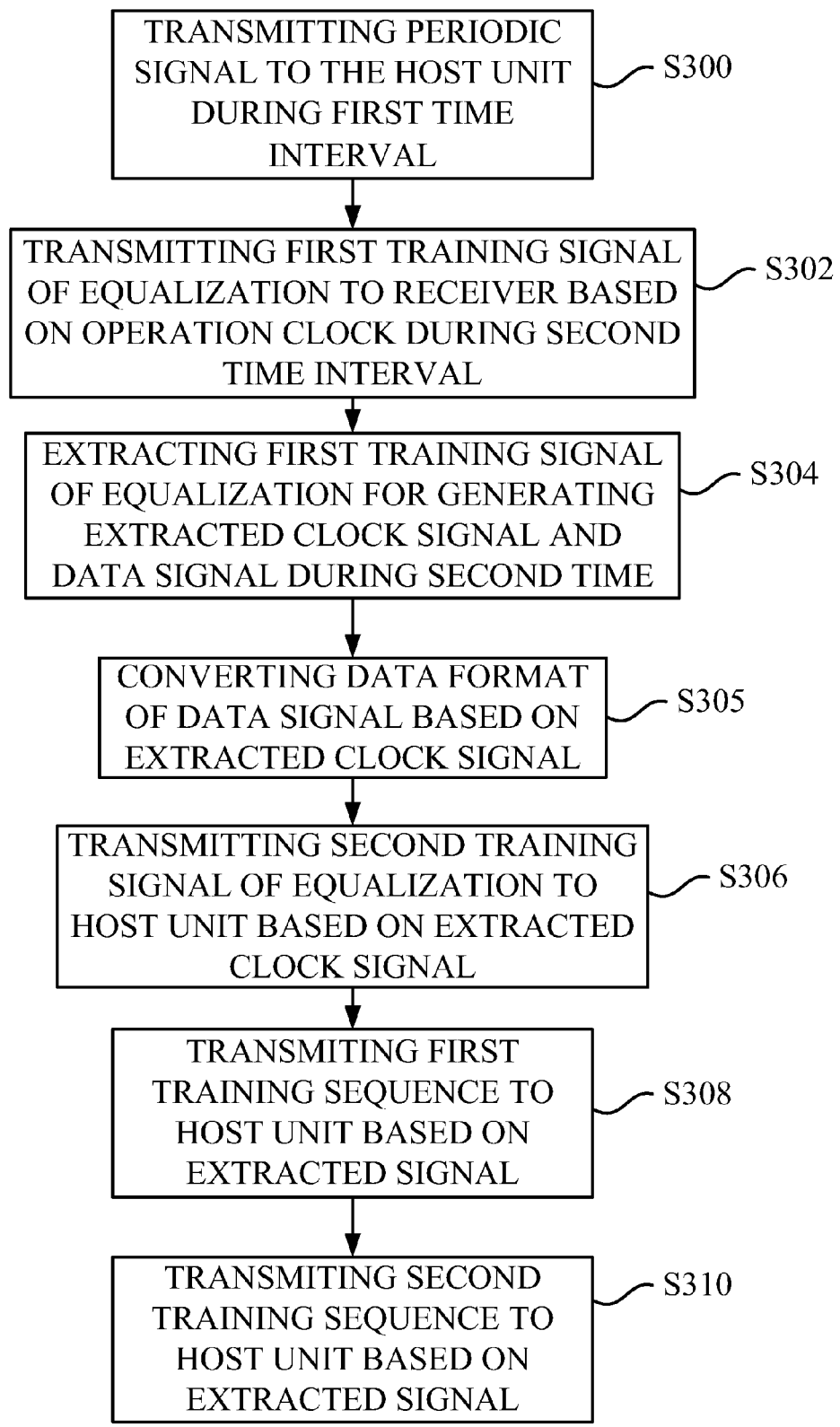
FIG. 3 is a flow chart of performing a clock-synchronized method according to one embodiment of the present invention.

Please refer to FIG. 1 and FIG. 3. FIG. 3 is a flow chart of performing a clock-synchronized method according to one embodiment of the present invention. The clock-synchronized method for a clock-synchronized system 100 is compatible to the universal serial bus (USB) protocol. The clock-synchronized system 100 includes a host unit 102 and a controlled device 104. The controlled device 104 has a receiver 106, a transmitter 108, a clock and data recovery device 110, and a sequence encoder and decoder 115. The clock-synchronized method includes the following steps.

In step S300, the transmitter 108 transmits a periodic signal to the host unit 102 during a first time interval (T1). In one embodiment, the periodic signal is a low frequency periodic signal (LFPS) wherein the LFPS functions as the handshaking communication signal between the transmitter 108 and the host unit 102.

In step S302, the host unit 102 transmits a first training signal of equalization (TSEQ) to the receiver 106 based on an operation clock during a second time interval wherein the transmitter 108 continuously sends the periodic signal to the host unit 102 during the second time interval (T2).

In step S304, the clock/data recovery device 110 extracts the first training signal of equalization (TSEQ) for generating an extracted clock signal 112 and a data signal 114 during the second time interval (T2).

In step S305, the sequence encoder/decoder 115 converts a data format of the data signal 114 based on the extracted clock signal 112.

In step S306, the transmitter 108 transmits a second training signal of equalization (TSEQ) to the host unit 102 based on the extracted clock signal 112 for training the host unit 102 during a third time interval (T3) wherein the receiver 106 and the transmitter 108 commonly refer to the extracted clock signal 112. In one embodiment, the first training signal of equalization (TSEQ) and the second training signal of equalization (TSEQ) are compatible to the universal serial bus (USB) protocol. In one preferred embodiment, the frequency of the operation clock is synchronized to the extracted clock signal 112. That is, in the clock-synchronized system 100, the clock signal host unit 102 is the same as the clock signals of the receiver 106 and the transmitter 108 of the controlled device 104 to replace the conventional clock circuit and elastic buffer for saving the cost. In the present invention, the clock synchronization means that one clock signal's frequency is the same as another clock signal's frequency or one clock signal's frequency is times another clock signal's frequency.

In step S308, the transmitter 108 transmits the first training sequence 1 (TS1) to the host unit 102 based on the extracted signal 112.

In step S310, the transmitter 108 transmits the second training sequence 2 (TS2) to the host unit 102 based on the extracted signal 112.

Person skilled should be noted that training signal of equalization (TSEQ) sequence is a type of training signal of equalization (TSEQ), and thus different signal format may be used for the training signal of equalization (TSEQ).

Figure 4:
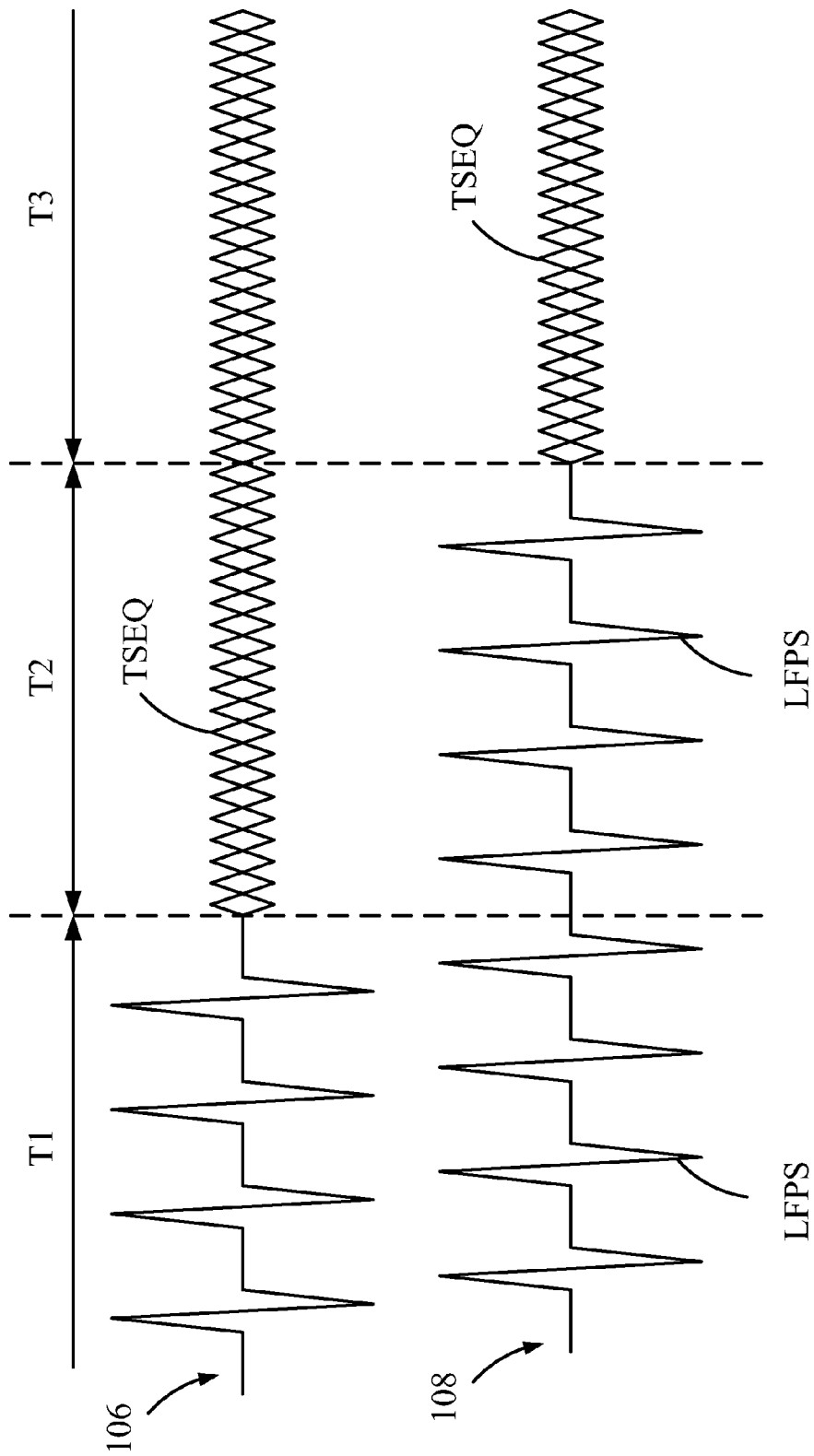
FIG. 4 is a schematic view of waveform profile when the transmitter/receiver performs the polling step according to one embodiment of the present invention.

FIG. 4 is a schematic view of waveform profile when the transmitter/receiver performs the polling step according to one embodiment of the present invention. First, the transmitter 108 transmits a periodic signal to the host unit 102 during a first time interval (T1) so that the transmitter 108 makes a handshaking communication with the host unit 102. In one embodiment, the transmitter 108 directly sends a low frequency periodic signal (LFPS) to the host unit 102 and there is no need to provide the extracted clock signal during the first time interval (T1).

During the second time interval (T2), the receiver 106 receives the first training signal of equalization (TSEQ) from the host unit 102. The received frequency of first training signal of equalization (TSEQ) of the receiver 106 is the transmitting frequency of the host unit 102, e.g. the frequency of the operation clock, 5 Gbps, based on USB 3.0 SuperSpeed. The transmitter 108 continuously sends the periodic signal to the host unit 102 during the second time interval (T2) so that the clock/data recovery device 110 has enough time to extract the first training signal of equalization (TSEQ) for generating an extracted clock signal 112 and a data signal 114 during the second time interval (T2). In other words, during the second time interval (T2), the clock/data recovery device 110 is capable of locking the frequency of the operation clock, 5 Gbps, based on USB 3.0 SuperSpeed. In one embodiment, the second time interval has a range from 20 ns to 4 ms. In one preferred embodiment, the second time interval has a range from 1 μs to 1 ms so that the clock/data recovery device 110 can extract the first training signal of equalization (TSEQ) during the second time interval (T2).

Finally, during the third time interval (T3), the transmitter 108 transmits a second training signal of equalization (TSEQ) to the host unit 102 based on the extracted clock signal 112 of the clock/data recovery device 110 for training the host unit 102.

According to the above-mentioned descriptions, the present invention provides a clock-synchronized method which is compatible to the universal serial bus (USB) protocol for synchronizing the host unit's clock signal with the clock signal of the receiver and transmitter of the controlled device in clock-synchronized system. Specifically, the first training signal of equalization (TSEQ) and the second training signal of equalization (TSEQ) based on USB 3.0 protocol synchronizes the host unit's clock signal with the clock signal of the receiver and transmitter of the controlled device in clock-synchronized system. That is, in the clock-synchronized system 100, the clock signal host unit 102 is the same as the clock signals of the receiver 106 and the transmitter 108 of the controlled device 104 to replace the conventional clock circuit and elastic buffer for saving the cost. In the present invention, the clock synchronization means that one clock signal's frequency is the same as another clock signal's frequency or one clock signal's frequency is times another clock signal's frequency.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A clock-synchronized method for a clock-synchronized system wherein the clock-synchronized system has a host unit and a controlled device, and the controlled device comprises a receiver, a transmitter and a clock/data recovery device, the clock-synchronized method comprising the steps of:
    (a) transmitting a periodic signal to the host unit during a first time interval by the transmitter;
    (b) transmitting a first training signal of equalization (TSEQ) to the receiver based on an operation clock during a second time interval by the host unit wherein the transmitter continuously sends the periodic signal to the host unit during the second time interval;
    (c) extracting the first training signal of equalization (TSEQ) for generating an extracted clock signal and a data signal by the clock/data recovery device during the second time interval; and
    (d) transmitting a second training signal of equalization (TSEQ) to the host unit based on the extracted clock signal by the transmitter during a third time interval wherein the receiver and the transmitter commonly refer to the extracted clock signal.

2. The clock-synchronized method of claim 1, wherein the first training signal of equalization (TSEQ) and the second training signal of equalization (TSEQ) are compatible to a universal serial bus (USB) protocol.

3. The clock-synchronized method of claim 1, wherein the frequency of the operation clock is synchronized to the frequency of the extracted clock signal.

4. The clock-synchronized method of claim 1, wherein the first training signal of equalization (TSEQ) and the second training signal of equalization (TSEQ) are composed of a plurality of control type codes and data type codes.

5. The clock-synchronized method of claim 1, wherein the periodic signal is a low frequency periodic signal.

6. The clock-synchronized method of claim 1, further comprising a step (e) of transmitting a first training sequence (TS1) to the host unit based on the extracted clock signal by the transmitter after the step (d).

7. The clock-synchronized method of claim 6, further comprising a step (f) of transmitting a second training sequence (TS2) to the host unit based on the extracted clock signal by the transmitter after the step (e).

8. The clock-synchronized method of claim 1, wherein the second time interval has a range from 20 ns to 4 ms.

9. The clock-synchronized method of claim 1, wherein the second time interval has a range from 1 μs to 1 ms.

* * * * *